United States Patent

Weinger et al.

[11] Patent Number: 5,884,326
[45] Date of Patent: Mar. 16, 1999

[54] METHOD AND APPARATUS FOR DATA ACCESS

[76] Inventors: Ralph Weinger, 1801 JFK Blvd., Philadelphia, Pa. 19103; Bruce Weinger, 30 Fountain Ct., Cherry Hill, N.J. 08034

[21] Appl. No.: 137,452

[22] Filed: May 18, 1998

Related U.S. Application Data

[63] Continuation of Ser. No. 751,307, Nov. 18, 1996, abandoned.

[51] Int. Cl.⁶ .................................................. G06F 17/30
[52] U.S. Cl. ........................... 707/201; 707/10; 707/202
[58] Field of Search .............................. 707/201, 10, 202

[56] References Cited

U.S. PATENT DOCUMENTS

| | | | |
|---|---|---|---|
| 4,817,050 | 3/1989 | Komatsu et al. | 707/10 |
| 4,918,588 | 4/1990 | Barrett et al. | 707/10 |
| 5,131,087 | 7/1992 | Warr | 707/201 |
| 5,265,244 | 11/1993 | Ghosh et al. | 707/1 |

*Primary Examiner*—Wayne Amsbury
*Attorney, Agent, or Firm*—Scott J. Fields, Esq.; Klehr, Harrison, Harvey, Branzburg & Ellers, LLP

[57] ABSTRACT

Methods and systems for optimal access of data are disclosed. A system for optimally updating data is described wherein a central database transmits a location table to a remote terminal having an access time variant (ATV) storage medium wherein a first set of data items is stored. The data on the ATV medium can be displayed visually upon a user's accessing a particular piece of data from the ATV medium. The user's data access habits are indexed on a location table by the central database where the location table is optimized and updated according to the number of accesses the user makes to particular data items. A second set of data is then transmitted to the remote terminal along with the updated location table and stored on the ATV database in optimized form, thereby reducing the access time to the second set of data on all the remote terminals since each particular user's individual habits govern the optimization process.

7 Claims, 3 Drawing Sheets

METHOD AND APPARATUS FOR DATA ACCESS

This application is a continuation of patent application Ser. No. 08/751,307 filed Nov. 18, 1996, now abandoned.

FIELD OF THE INVENTION

This invention relates generally to methods and apparatus for accessing data. More specifically, this invention relates to methods and apparatus for improved access time to data stored on data storage media.

BACKGROUND OF THE INVENTION

Most types of computer systems which are in use today require the ability to store large amounts of data for ready access by system users. Data storage media technology has exhibited great advances in the last few years such that large amounts of data are able to be stored on computer systems. Several examples of data storage media in use today are floppy disks, hard disks, optical disks, magnetic tape, as well as other data storage devices.

It is known by those with skill in the art that information stored on data storage devices must be readily changed or updated either by a user or by another system as external conditions demand data updating. When a limited number of users have access to a database, or when the time for database updating is not critical, there is little problem in updating the storage medium with new information. However, when a database is being continually accessed or when a variety of users need access to the database for different information, it has generally been undesirable to take large amounts of time for updating the database but, desirable to provide efficient storage of a wide variety of data on the database so that many different users can be accommodated. There has been a long-felt need in the art for near optimal storage of data on databases thereby reducing access time by users to information on the database and providing efficient data updating.

In order to store extremely large amounts of data on a database, it is often necessary to use a mass storage medium such as, for example, magnetic tape, floppy disks, hard disks and optical disks, etc. Mass storage media are generally "access time variant" (ATV). As herein defined and used throughout, an "ATV" medium refers to any type of data storage medium wherein the last access of data stored on the medium influences the access time to the next item stored on the medium. It is usually extremely desirable to keep the access time to all items on the ATV medium as low as possible. The access time to data items on an ATV medium is determined by the time it takes the particular accessing means of the ATV medium to locate the requisite data item stored on the ATV medium. Maximum access time occurs when two consecutive pieces of data to be accessed reside at the most remote positions from one another on the ATV medium. Maximum access time can be empirically determined for any ATV medium by measuring all possible access times from prior datum to subsequent datum.

Certain prior art approaches have been utilized to retrieve information stored on a tape for display by a computer or on a video screen. U.S. Pat. No. 3,757,037, Bialek embodies such a system. The device embodied in the Bialek patent requires that information stored on a video cassette be grouped. See Bialek column 1, line 25. Some A priori knowledge of where to place and group related data is necessary to utilize the device embodied in the Bialek patent. Thus, Bialek fails to provide a computer database which is efficiently useful to a large variety of users, since grouping of information for fast access can only be tailored for specific individual user's tastes.

Another prior art approach to creating a database containing information which is available to a variety of users is embodied in U.S. Pat. No. 4,450,477, Lovett. The device disclosed in the Lovett patent shows a television information system which transmits selected video picture information to a number of subscribers who have televisions connected to the system. See Lovett, column 6, lines 40–45. According to the operation of the Lovett system, a subscriber makes a selection from the system by transmitting a request to the database. See Lovett, column 7, lines 10–15. A central computer having a central database searches the database for the information and sends it over a carrier frequency which has been specifically dedicated to the specific subscriber.

The device embodied in Lovett requires that each user be given a specific television frequency for interfacing with a complex central database. The inventors of the subject matter disclosed and claimed herein have determined that the most economical and efficient way for many users to optimally access data on a database is to distribute the databases among the individual users. The databases distributed among the individual users can then be continuously updated according to an optimal updating algorithm. The device in the Lovett patent fails to provide any of these features. Thus, the device in Lovett does not satisfy the long-felt need in the art for an economical and efficient database which can be used in the homes of a multitude of users.

It has been known in the computer art to provide remote terminals which can communicate with a central database and computer system. See U.S. Pat. No. 4,658,290, McKenna et al. The device embodied in the McKenna et al. patent discloses a data storage and transmission system for accumulating data and transmitting the data to a central location. See column 1, lines 18–21 of McKenna et al. However, the device described and disclosed in the McKenna et al. patent merely transmits statistics about television viewing habits and product purchases of selected users by transmitting information to the central database over a cable line. The device in the McKenna et al. patent does not provide for continuous and optimal updating of data in remote databases which can be used by a large number of subscribers. Thus, the device embodied in the McKenna et al patent does not fulfill the long-felt need in the art for distributed databases with optimal data storage.

Periodic updating of information which is displayed to subscribers through a video display device has also been known in the computer art. See U.S. Pat. No. 4,203,130, Doumit et al. The Doumit patent discloses a device which updates data from a central database periodically. See Doumit et al. column 2, lines 11–15. However, the system disclosed in Doumit provides globally updated information to all users of the system in a single order and format. Thus, the device disclosed and described in Doumit et al can not provide optimally updated data to a multiplicity of remote databases when different users of the remote databases have unique data access habits.

The inventors have recognized a long-felt need in the art for a computer system having databases distributed among a potentially unlimited number of users. The information stored in all of the databases must be continuously updated and optimally placed on an ATV storage medium according to the desires and access habits of each the particular user. The inventors have also recognized a long-felt need in the art for systems which display optimally updated data which has been stored according to a user's particular statistical data access habits. The inventors have invented methods and systems which solve these problems and fulfill the aforementioned long-felt needs in the computer art for systems and methods for optimal updating of data.

SUMMARY OF THE INVENTION

Accordingly, it is an object of the present invention to provide apparatus and methods for distributing databases to many users in a system.

It is another object of the present invention to provide databases having ATV media which can store large amounts of data.

It is yet another object of the present invention to provide a central database which provides information to the distributed databases located on remote terminals.

It is still another object of the present invention to provide near optimal updating of data broadcast from the central database to distributed remote databases.

It is still another object of the present invention to accomplish optimization in minimal time.

It is still another object of the present invention to provide optimal or near optimal updating of information to the remote databases according to the particular selection habits of individual users.

It is yet another object of the present invention to broadcast the data to the remote terminals simultaneously over a wideband channel.

It is yet another object of the present invention to provide methods and systems by which a user can selectively act on any piece of data optimally stored on a database.

These and other novel objects, features, and advantages of the present invention are accomplished by methods of data updating from a central database.

Preferably, the steps of these methods comprise transmitting a first set of data items and a location table from a central database to a remote terminal having at least one ATV storage medium. In further preferred embodiments, the data items are stored on the ATV medium and the location table is stored in a location table memory.

Statistics are collected about a user's data access habits in accessing the ATV medium. In still further preferred embodiments, the ATV medium may be, for example, optical disks, hard disks, floppy disks or magnetic tape. The statistics are then indexed according to a desired algorithm, thereby creating an updated location table which is stored in the location table memory. In yet other preferred embodiments, a second set of data items is transmitted to the remote terminal and the ATV medium is updated according to the updated location table.

In addition to the methods described in accordance with this invention, systems for near optimal updating of data on a database are provided. In a preferred embodiment, a central transmitting station wherein data is stored is provided. Means for transmitting data is provided interfaced with the central transmitting station. The data transmission line is preferably adapted to transmit data over wideband carrier frequencies. In further preferred embodiments, at least one remote terminal is interfaced with the transmitting means and receives the data. In still further preferred embodiments, a feedback means coupled between the remote terminal and the central transmitting station for optimally updating data on the remote terminal based upon a user's access history to the data on the remote terminal is provided.

The systems described in accordance with this invention provide optimal or near optimal updating of databases located on remote terminals. Each remote terminal is updated according to its specific user's data access habits, thereby providing each user of each remote terminal optimal access time to the data stored in his particular remote terminal. This result has not been achieved heretofore in the computer art and fulfills a long-felt need in the computer art for systems which provide a multiplicity of users with optimal or near optimal access to data transmitted from a central database and stored on a remote terminal.

BRIEF DESCRIPTION OF THE DRAWINGS

FIG. 5 is a graph showing transmission of location tables and data to the remote terminals versus time.

DETAILED DESCRIPTION OF PREFERRED EMBODIMENTS

Figure 1:
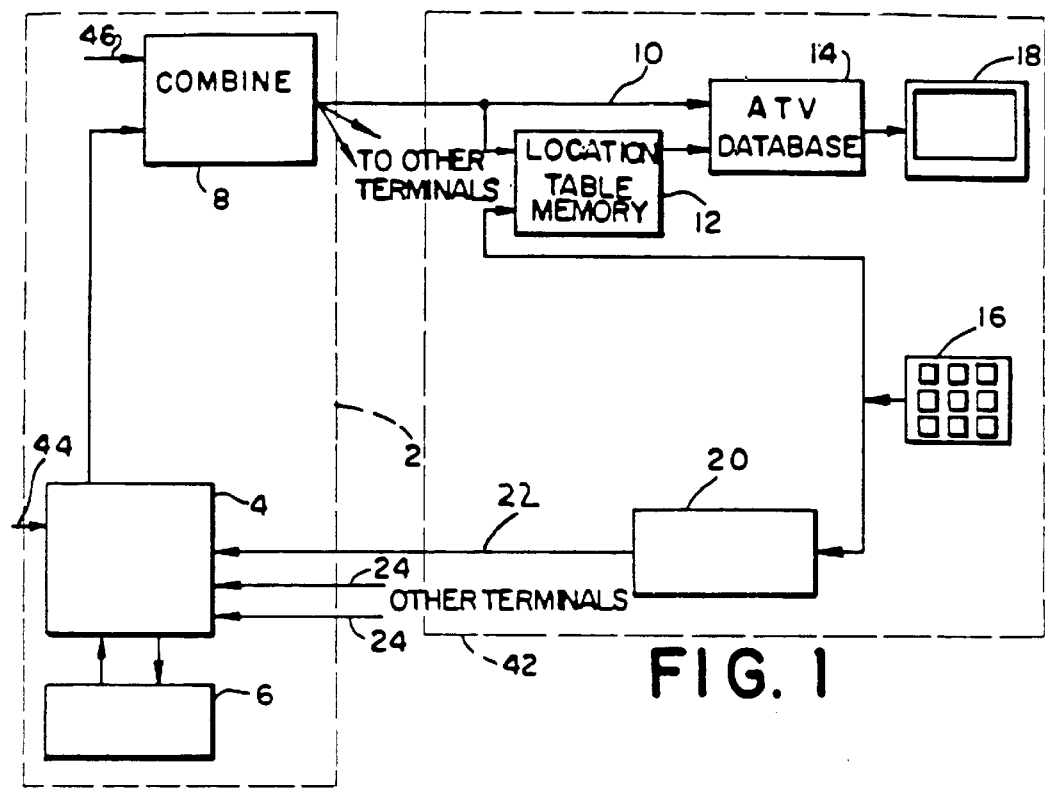
FIG. 1 is a block diagram of a preferred embodiment of systems provided in accordance with this invention wherein the remote terminals are physically discrete from the central database.

Methods and apparatus provided in accordance with this invention fulfill a long-felt need in the computer art for optimal updating of data from a central database to a multiplicity of remote databases servicing a variety of users. As used herein, the term "remote" means that the access time variant storage medium or the entire remote terminal is electrically discrete from the central database. It is envisioned that the ATV medium or the terminal might, however, be placed in close physical proximity to the central database.

In a preferred embodiment, a system for near optimal updating of data on a database is provided. The system is preferably comprised of a central transmitting station wherein data is stored. The central transmitting station is generally at a remote location from a plurality of distributed remote terminals. The central transmitting station contains, in preferred embodiments, vast amounts of data stored on a variety of storage media. The remote terminals are preferably interfaced through means for transmitting data with computers in the central transmitting station that control data access and transmission.

In still other preferred embodiments of systems described in accordance with this invention, the remote terminals are further comprised of means for ATV storage of data. Preferably, the means for ATV storage of data, for example, optical disks, magnetic tapes, floppy disks, hard disks, or magnetic spools, etc., is interfaced with the data transmission means. In still further preferred embodiments, the remote terminals are provided with a means for storing a location table coupled to the ATV medium. The location table orders the data according to a user's particular data access habits.

Preferably, means for visually displaying the data is provided. However, the accessed data might also be bussed to other devices for a variety of uses other than visual display. The data stored on the ATV storage medium is preferably comprised of both color video, audio and other information which can be accessed by the remote terminal for display. In still further preferred embodiments, the means for visually displaying the data is interfaced with the means for ATV storage of the data.

Preferably, arbitrarily ordered data is transmitted from the central database to the remote terminals over the data transmission line along with a location table. The data is stored on an ATV medium and the location table is stored in a location table memory. In preferred embodiments, statistics about a user's data access habits are collected and stored. The location table memory is interfaced with means for accessing the data by the user and is also interfaced with means for storing statistics about the user's data access habits.

In general, an index corresponding to the user's data access habits or access history and which determines how data will be stored on the ATV medium is generated by a set of particular rules or algorithm and the statistics. Preferably, the location table is then updated with the generated index thereby creating an updated location table. Then the ATV medium on the terminal can be optimally updated according to the user's particular access history. Any algorithm may be used which specifies a desired updating and storage technique. The location table may be updated periodically or aperiodically as is particularly desired. When periodic updating is desired, the access history is combined in the algorithm at set time intervals. Otherwise, aperiodic updating may be performed at times when it is convenient to combine the access history and the algorithm.

The systems and methods provided in accordance with this invention can be adapted for use in a variety of situations. An example of where these systems and methods are useful is in a computerized catalog or shopping network wherein data exemplifying a large variety of goods, products and services are stored on a vast database in the central transmitting station. The product information and data stored in the central transmitting station would be broadcast to each of the remote terminals via a data transmission line where it would be stored on the ATV medium in each of the remote terminals.

When a user desires to shop on the shopping network, he or she would access the ATV data storage medium with his own remote terminal by formulating a request directed to a particular type of product or category. The remote data terminal would preferably display the data stored on the ATV data storage medium on a video terminal or television set. Additionally, the user's data access habits would be tabulated in a buffer according to the various requests of the different products on the ATV storage medium. The individual user's data access habits would thereby form a set of statistics which could then be used with the algorithm for optimal data updating.

With these statistics, the catalog on the ATV data storage medium could then be updated such that the information concerning particular products which are accessed most often by the user would be placed around the "center" of the ATV storage medium. The term "center" as used herein means that the data accessed most often is located on the database such that the access time to it is minimized. Similarly, less often accessed data is located on the database such that its access time is greater. Thus, the access time to the ATV storage database would be effectively "optimized" with respect to each user depending upon which types of products embodied in data on the ATV database are accessed most often by the user.

The application of a computer shopping network is efficiently accomplished with methods and systems provided in accordance with this invention. However, the invention herein described is not limited to home shopping networks, but rather, is adaptable to any system which requires near optimal updating of data stored on ATV medium in remote terminals and broadcast from a central transmitting station. The methods and systems herein described are believed generally useful for these purposes.

Referring now to the drawings wherein like numerals refer to like elements, FIG. 1 is a functional block diagram of a preferred embodiment of a system for improved data access. The central transmitting station is shown generally at 2. The central transmitting station 2 has means for generating location tables 4 which also provides means for data analysis. Means for historical data storage 6 interfaced with the location table generator and data analysis block 4 is provided to enable the central transmitting station 2 to store some or all of the user's particular data access habits. Location table generator and data analysis block 4, in preferred embodiments, utilizes an algorithm which specifies the desired technique by which the database is to be ordered for each user. The algorithm input at 44 may be changed to fit any particular data storage scheme desired by the operators of the central transmitting station. The algorithm 44 and location table generator 4 create location tables based on each particular user's data access habits so that each of the ATV databases on the remote terminals 42 can be optimally updated. The location tables are based on each particular user's data access habits with his or her own remote terminal.

Block 8 is interfaced with location table generator 4 and combines all of the location tables with data 46 for transmission to the users at the various remote terminals. Items 46 contained in the database of the central transmitting station 2 are combined in block 8 with the location tables generated for each user by the location table generator means 4.

The combine block 8 broadcasts the location tables and the data 46 from the central transmitting station 2 over a wide bandwidth path 10 to the remote terminals 42. In preferred embodiments, the location table for each remote terminal 42 is uniquely identified for each remote terminal. Thus, each remote terminal 42 is adapted to receive only its unique location table broadcast from the central transmitting station. The location table for each terminal is stored on location table memory 12 which is interfaced with an ATV database 14. Each location table carries an index which is based on the statistics gathered from the particular user's data access habits with his or her own remote terminal. In further preferred embodiments the data are then stored on the ATV database 14 at locations specified by the unique location table for that particular remote terminal 42.

A user can make a selection of particular information from his ATV database 14 with means for selecting 16. The information selected by the user with means for selecting 16 is retrieved from the ATV database 14 and the particular item selected is output on a display 18. A buffer storage of the particular selection history from means for selecting 16 is shown at 20. Buffer 20 stores the latest history about the user's data access habits over time. A narrow bandwidth data return 22 from buffer storage 20 transmits the statistics of the selection history back to data analysis and location table generator 4 at central transmitting station 2. This selection history, along with the selection histories from other terminals 24, is transmitted back to the central transmitting station to location table generator 4 so that the location tables for all remote terminals can be optimally updated.

Figure 2:
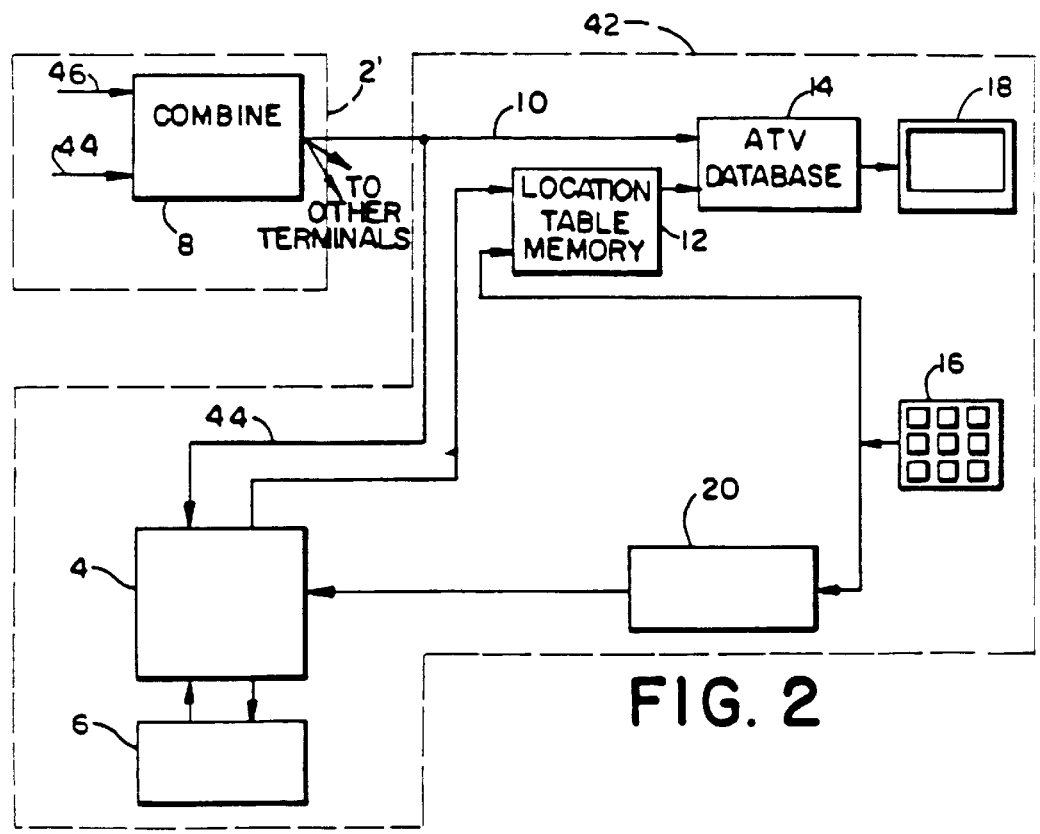
FIG. 2 is a block diagram of a preferred embodiment of systems provided in accordance with this invention wherein the remote terminals are self-adjusting.

FIG. 2 is a preferred embodiment of a system for improved data access wherein each of the remote terminals is "self-adjusting." "Self-adjusting" as used herein means that each ATV database in each remote terminal internally orders itself according to the specific data selection history stored in buffer 20. Thus in preferred embodiments, central transmitting station 2 comprises a combine block 8 which initially orders the data 46 according to a changeable algorithm 44 and broadcasts the data and the algorithm over a wideband path 10 to the various remote terminals 42.

The data transmitted over the wideband path 10 are stored on ATV database 14. Algorithm 44 is input to data analysis and location table generator 4. Data analysis and location table generator 4 is interfaced with a historical data storage block 6 which is now contained within remote terminal 42. The user makes selections with means for selecting 16 which preferably is interfaced with location table memory 12. Location table memory 12 is also preferably interfaced with ATV database 14. Particular data selections may be displayed at display 18. Furthermore, buffer 20 is interfaced with means for selecting 16. Buffer 20 is adapted to receive and store the total history of the particular user's data selection habits over a discrete period of time. Buffer storage block 20 is also interfaced with data analysis and location table generator block 4. After an interval of time, buffer 20 transmits the selection history to data analysis and location table generator 4. Data analysis and location table generator 4 generates an optimally updated location table for the remote terminal utilizing the selection history stored in buffer 20, the data stored in historical data storage block 6 and the previously transmitted algorithm 44. In this fashion, the location table for the remote terminal is updated and contains the locations of data to be optimally placed on the ATV medium 14. Thus, data 46 will be optimally stored on ATV medium 14 according to each remote terminals particular updated location table.

The self-adjusting terminal of FIG. 2 has an internal feedback loop which eliminates the need for a narrow bandwidth data return shown at 22 in FIG. 1. In certain applications, the self-adjusting remote terminals provide a more economical implementation of systems for optimally updating data since the need for a narrow band frequency data return is eliminated. Furthermore, self-adjusting terminals provide enhanced user privacy since the particular user's access history is never transmitted out of the remote terminal. This advantage has not heretofore been provided by other systems.

Figure 3:
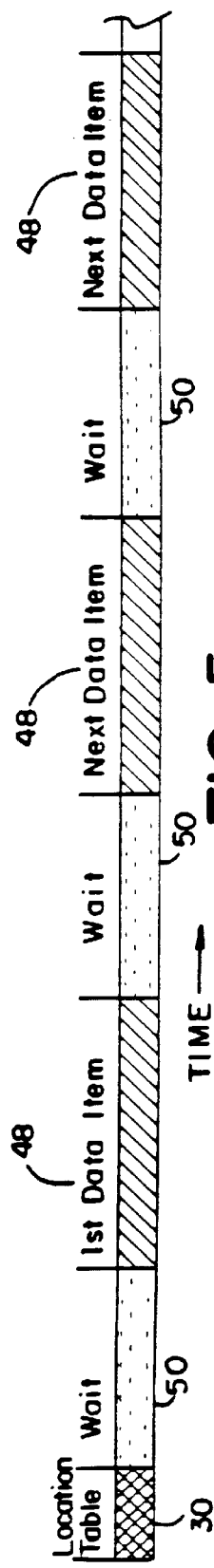
FIG. 3 is a conceptual block diagram of a location table for an ATV database in a remote terminal as the ATV database undergoes optimal ordering.

FIG. 3 shows the configuration of the ATV storage medium 14 before ordering and after ordering. The un-ordered ATV database is shown at 26. The data stored in the database 26 is random, with each item being stored on the ATV database 14 as it is initially broadcast by the central transmitting station. The access time to any particular item from the random ATV database 26 is not optimal, since, depending upon the user's particular data access habits, the items of interest are scattered throughout the ATV database. Thus, the access time to any particular item of interest on the database is potentially great since a means for accessing the data on the ATV database 26 might have to electrically or physically traverse a great distance before it reaches the particular location where the item is stored on the ATV database 26. Furthermore, once the accessing means reaches a present data item location, the time it takes to reach a subsequent desired data item location may also be maximized since the data is random. Therefore, it is desirable to optimally update random ATV database 26 with a desired ordering algorithm 28.

After ordering is accomplished at 28, the near optimal database is constructed 30. The number of particular items accessed by the user has now been stored in buffer 20. A location table for each remote terminal is then created by data analysis block 4. The location table then directs the data to their optimal locations on the ATV database 30 so that when a user wishes to access a particular item or group of items again, the data access time is minimized. Since each user's optimally ordered location table is stored on location table memory 12 in the remote terminal, the data access time for each user is thereby optimized.

Figure 4:
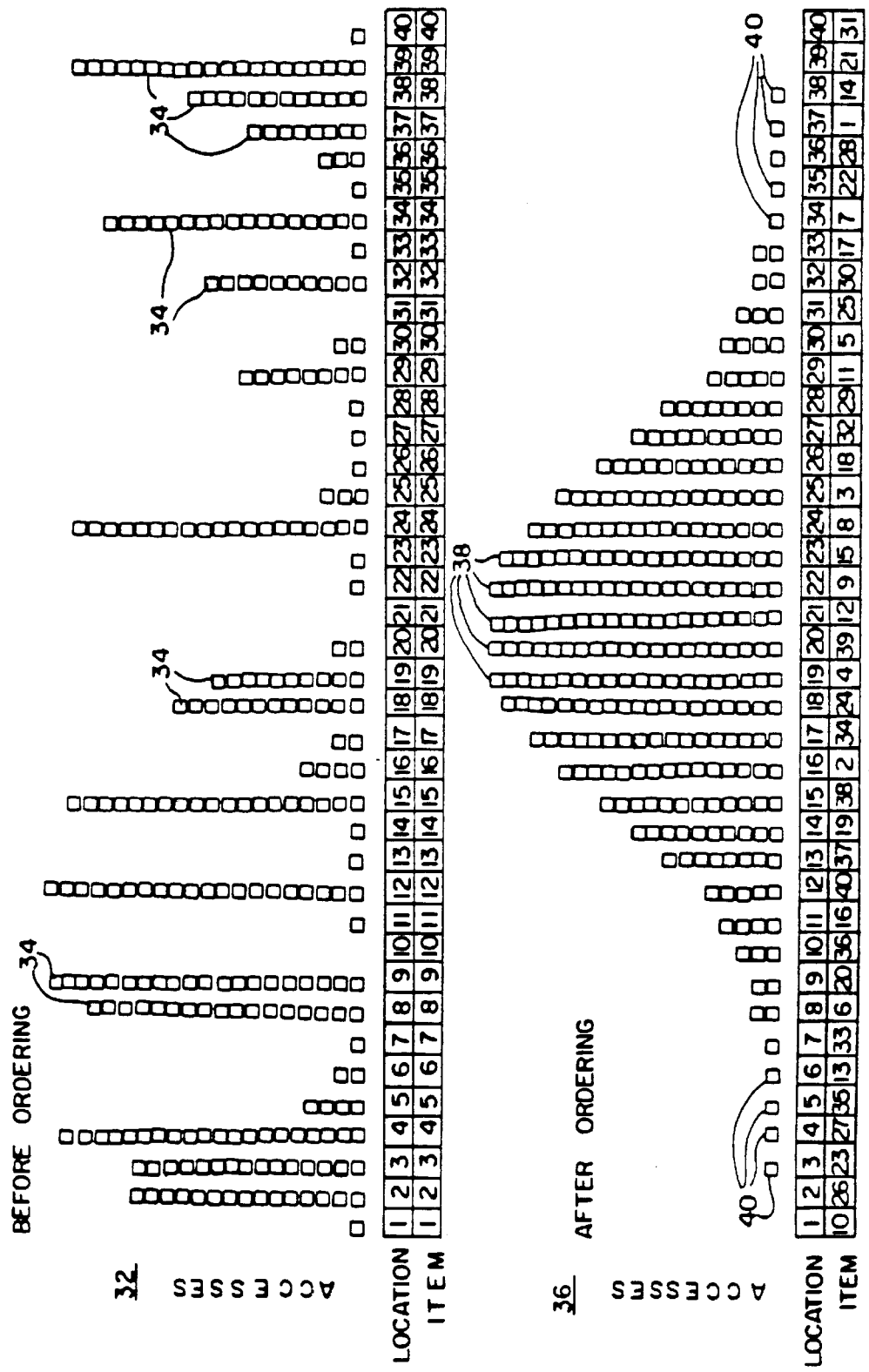
FIG. 4 is a graph of an ATV database showing the distribution of data items before the ATV database has been updated and after the ATV has been updated according to a particular updating algorithm.

FIG. 4 is a graphical depiction of the ordering process and shows the positioning of the data items on the ATV database in each remote terminal. The situation before ordering is shown at 32. The number of "accesses" to particular data items on the ATV database is shown on the Y axis, generally at 34 which is preferably stored in the buffer 20. Low access items are exemplified by locations 1, 7, 13, 14, 22, 23, etc. The higher access items are exemplified by locations 4, 9, 12, 15, 24, etc. In this example, access time would not be optimized with data stored on the ATV database in the present locations, since, for example, if the particular accessing means were positioned at item 39 and the user wished to access item 2, the accessing means would have to travel almost the complete distance of the ATV database before reaching item 2.

The optimized ATV database is shown at 36. Here, the data analysis block 4 will have created a location table which will position the high access items shown at 38 around the center of the ATV storage medium, while the lower access items shown at 40 will be positioned at either end of the ATV storage medium. If an accessing means were positioned at data item 12, which is located on the optimized ATV database at location 21, and the user wished to select data item 4, which is located on the optimized database at location 19, the accessing means would traverse only a short distance before reaching location 19 to access data item 4. The ATV database is said to be "optimized" since the access time to any particular piece of data is minimized. Thus, the systems and methods according to this invention fulfill a long-felt need in the art for methods and systems which optimize data storage on an ATV database according to a particular user's access habits. Optimization would occur within a short period after the random, un-ordered data 32 were broadcast and would result in the ordered data 36.

Referring now to FIG. 5, a graph of data transmission from a central transmitting station to the remote terminals versus time is shown. The location table 30 contains the desired index locations of the particular items in the ATV database as forecast by data analysis block 4. The location tables 30 are broadcast to all of the remote terminals. The particular remote terminal which corresponds to the location table for that terminal is entered onto that terminal. Each data item is successively broadcast to all of the remote terminals at time 48. The data is sent serially, separated by wait times 50. Wait time 50 is governed by the maximum time it takes a data item to be placed in its position on the ATV database. Thus, wait time 50 between broadcast of each successive data item 48 can be generalized as the maximum access time which may be empirically determined for the ATV database. The wait time may be shorter, however. During the wait time 50, transmission of other types of data to other types of devices may be accomplished.

There have thus been described certain preferred embodiments of methods and systems provided in accordance with this invention. These methods and systems satisfy a long-felt need in the art for methods and systems which provide near optimal access time to ATV databases having large amounts of information stored thereon. While preferred embodiments have been described and disclosed, it will be recognized by those with skill in the art that modifications are within the spirit and scope of the invention. The disclosed embodiments and appended claims are intended to cover all such modifications.

What is claimed is:

1. A system for optimally storing and updating data on an access time-variant storage medium, comprising:

a central data transmitting station including central data storage means for storing a database comprising original data representing a plurality of items;

at least one remote terminal comprising remote data storage means for storing data, said data storage means containing at least one access time-variant storage medium on which original data transmitted from said central station may be stored;

means for interfacing said central transmitting station with said remote terminal to transmit said original data from said central transmitting station to said remote terminal for storage means;

accessing means at said remote terminal for storing the original data received by said remote terminal at controllable different positions on said access time-variant storage medium;

means for monitoring the frequency at which said data on said access time-variant storage medium are accessed by said accessing means and for producing access-frequency representing signals;

algorithm generating means for generating signals and for controlling the positions at which said data are to be stored on said access time-variant storage medium; and data-location control means responsive to said algorithm-generated signals and to said access-frequency representing signals for controlling the storage of said data on said accessing time-variant storage medium at positions on said storage medium such as to minimize the access time for accessing data representing said items, the access time-variant storage medium being adapted to store all of the data thereon after the positions are controlled.

2. The system of claim 1, wherein said data-location control means is at said central data transmitting station, and said system comprises feedback means for transmitting said access-frequency generating signals to said central data transmitting station.

3. The system of claim 1, wherein said data-location control means is at said remote terminal.

4. The system of claim 1, wherein said algorithm is such as to cause the more frequently-accessed data to be stored adjacent to each other on said access-time variant medium and said less frequently accessed data more remotely on said medium.

5. The system of claim 4, wherein said more-frequently accessed data are stored at and on both sides of the center of said medium.

6. The system of claim 5, wherein said most-frequently accessed data are stored at the center of said medium, and said less frequently-accessed data are stored on both sides of said center with the less frequently accessed data progressively further from the center.

7. The system of claim 1, wherein said algorithm-operating means is controllable to change the algorithm which it generates.

* * * * *